(12) United States Patent
Milne

(10) Patent No.: US 9,695,692 B2
(45) Date of Patent: Jul. 4, 2017

(54) THREADED SHANK, CONNECTION ASSEMBLY AND GAS TURBINE ENGINE FOR IMPROVED FATIGUE LIFE OF THREADS

(71) Applicant: Siemens Aktiengesellschaft, Munich (DE)

(72) Inventor: Trevor Milne, Sheffield (GB)

(73) Assignee: Siemens Aktiengesellschaft, Munich (DE)

( * ) Notice: Subject to any disclaimer, the term of this patent is extended or adjusted under 35 U.S.C. 154(b) by 378 days.

(21) Appl. No.: 14/395,232

(22) PCT Filed: May 14, 2013

(86) PCT No.: PCT/EP2013/059919
§ 371 (c)(1),
(2) Date: Oct. 17, 2014

(87) PCT Pub. No.: WO2013/182390
PCT Pub. Date: Dec. 12, 2013

(65) Prior Publication Data
US 2015/0078901 A1    Mar. 19, 2015

(30) Foreign Application Priority Data

Jun. 6, 2012 (EP) .................................... 12171073

(51) Int. Cl.
*F01D 5/06* (2006.01)
*F01D 25/24* (2006.01)
(Continued)

(52) U.S. Cl.
CPC ............ *F01D 5/066* (2013.01); *F01D 25/243* (2013.01); *F16B 31/06* (2013.01); *F16B 35/041* (2013.01);
(Continued)

(58) Field of Classification Search
CPC ........ F01D 5/066; F01D 25/243; F16B 31/06; F16B 35/041
See application file for complete search history.

(56) References Cited

U.S. PATENT DOCUMENTS 2,256,269 A    9/1941  Brackett
2,347,910 A    5/1944  Johnson
(Continued)

FOREIGN PATENT DOCUMENTS

CA    549862 A    12/1957
CN    1294245 A    5/2001
(Continued)

OTHER PUBLICATIONS

JP Office Action dated Nov. 21, 2016, for JP patent application No. 2015-515451.
(Continued)

*Primary Examiner* — Richard Edgar
(74) *Attorney, Agent, or Firm* — Beusse Wolter Sanks & Marie

(57) ABSTRACT

A threaded shank for engaging with a threaded further component is provided herein, the further component having a cylindrical first thread with a uniform first thread pitch and a uniform first thread angle, the threaded shank including a second thread with a uniform second thread pitch and a uniform second thread angle and including a third thread with a uniform third thread pitch and a uniform third thread angle along an axial expanse of the third thread. The first thread angle and the second thread angle and the third thread angle being substantially identical, the first thread pitch and the second thread pitch and the third thread pitch being substantially identical, wherein the second thread and the
(Continued)

third thread are spaced apart axially by a thread-free region, a second thread helix and a third thread helix have an axial offset to one another.

20 Claims, 5 Drawing Sheets

(51) Int. Cl.
*F16B 35/04* (2006.01)
*F16B 31/06* (2006.01)
*F16B 5/02* (2006.01)

(52) U.S. Cl.
CPC ...... *F05D 2220/32* (2013.01); *F05D 2230/60* (2013.01); *F05D 2260/30* (2013.01); *F05D 2260/31* (2013.01); *F16B 5/0275* (2013.01); *Y10T 29/4932* (2015.01); *Y10T 403/56* (2015.01)

(56) References Cited

U.S. PATENT DOCUMENTS

| | | | |
|---|---|---|---|
| 2,555,661 A | 6/1951 | Rudd | |
| 2,660,399 A | 11/1953 | Robinson et al. | |
| 4,071,067 A | 1/1978 | Goldby | |
| 4,545,104 A | 10/1985 | Hattan | |
| 4,661,031 A | 4/1987 | Heine | |
| 4,854,797 A | 8/1989 | Fourd | |
| 4,956,888 A | 9/1990 | Green | |
| 5,537,814 A * | 7/1996 | Nastuk | F01D 5/066 60/796 |
| 6,302,648 B1 | 10/2001 | Konishi et al. | |
| 2001/0002963 A1 | 6/2001 | Haje et al. | |
| 2002/0141816 A1 | 10/2002 | Anderson | |
| 2010/0281677 A1 | 11/2010 | Hettich | |
| 2010/0310337 A1 | 12/2010 | Chen | |

FOREIGN PATENT DOCUMENTS

| | | |
|---|---|---|
| CN | 201170251 Y | 12/2008 |
| EP | 2415967 A | 2/2012 |
| EP | 2415967 A1 | 2/2012 |
| GB | 723882 A | 2/1955 |
| GB | 2452932 B | 8/2009 |
| GB | 2452932 B8 | 8/2011 |
| JP | 2001056010 A | 2/2001 |
| JP | 2002519599 A | 7/2002 |
| RU | 2419733 C1 | 5/2011 |
| WO | 9010799 A1 | 9/1990 |
| WO | 03098057 A1 | 11/2003 |
| WO | 2012016981 A1 | 2/2012 |

OTHER PUBLICATIONS

RU Office Action dated Apr. 10, 2017, for RU patent application No. 2014153553.
JP Office Action dated Mar. 7, 2017, for JP patent application No. 2015-515451.

* cited by examiner

THREADED SHANK, CONNECTION ASSEMBLY AND GAS TURBINE ENGINE FOR IMPROVED FATIGUE LIFE OF THREADS

CROSS REFERENCE TO RELATED APPLICATIONS

This application is the US National Stage of International Application No. PCT/EP2013/059919 filed May 14, 2013, and claims the benefit thereof. The International Application claims the benefit of European Application No. EP12171073 filed Jun. 6, 2012. All of the applications are incorporated by reference herein in their entirety.

FIELD OF THE INVENTION

This invention relates particularly but not exclusively to gas turbines or turbomachines with centre bolt mounted compressor and power turbine discs, where the centre bolt or tension stud has threads at its ends. The invention applies also to different types of machines, also non-turbomachines or turbomachines with blades being integral with the rotor.

BACKGROUND OF THE INVENTION

In one known configuration of gas turbines engines, a number of discs, some comprising radially extending blades which are inserted to the discs, are provided to form a rotor. There are sets of discs for compressor blades and sets of discs for turbine blades. The respective sets of discs are retained by a turbine nut and a compressor nut respectively applied to one or two tension studs, the nuts and the studs are typically also used to apply a preload to tension the arrangement to ensure that all rotating parts are secure during operation of the turbine.

In current turbines, the rotor may be held together by a pair of tension studs. In the following one possible way how to assemble a compressor and a turbine is explained in a simplified manner. A first threaded end of the first stud may engage into a threaded bore in a shaft element of the rotor. A compressor disc then may be pushed axially into position and locked to the shaft element. Further compressor discs may additionally be pushed into position. Finally a threaded compressor nut may be engaged to a second threaded end of the first stud and tightened such that all compressor discs are secured to each other and the shaft element. For the turbine discs, a first threaded end of the second stud may engage in a threaded bore of the other end of the shaft element. Then turbine discs may be pushed axially into position from the opposite side and a threaded turbine nut may be applied to a second threaded end of the second stud and tightened such that all turbine discs may be locked to the shaft element.

During operation of the gas turbine engine stress may be experience in the studs. Furthermore stress may be not evenly distributed over all threads of the studs and the nuts with the consequence of local peak loads that could result in fatigue of the affected threads and consequently to potential failures.

In FIG. 1A, a threaded compressor stud (CS) is rotated into threaded engagement into a threaded bore in an intermediate shaft (INTS) and compressor discs (CD) are slid over the compressor stud (CS) from left to right during assembly. An inlet shaft (IS) is then mounted onto the compressor stud (CS) and a compressor pre-load nut (CN) threaded onto the compressor stud end. For assembly a hydraulic tool may be applied to stretch the stud (CS) and the compressor nut (CN) is tightened to engage the inlet shaft (IS) before the tool is removed. This retains the pre-load—which also can be called pre-tension—applied to the compressor stud (CS) via the nut (CN). The stretch required may be affected by relative thermal and mechanical expansion and contraction at different operating conditions of the stud (CS) and the clamped components, e.g. the compressor discs (CD).

FIG. 1B shows a turbine stud (TS) threaded into another axial end of the intermediate shaft (INTS). Then—not yet shown in FIG. 1B—the next stage is to assemble the turbine discs (TD) onto the turbine stud (TS) from right to left with a turbine nut (TN) being threaded onto the other end of the turbine stud (TS), as shown in FIG. 1C. The hydraulic tool is applied to stretch the turbine stud (TS) and the nut (TN) is tightened to retain the pre-load or pre-tension when the tool is removed.

It will be appreciated that this is a complicated arrangement which requires careful machining and assembly for adequate operation and a long service life. The material of the stud, the dimensions of the stud, the amount of stretch of the stud, etc. has to be considered to ensure sufficient rotating load at all operating conditions of the gas turbine engine. In particular, the threaded connections and the studs may experience stress.

It has to be noted that with "load" a clamping force in axial direction—or at least with a vector component in axial direction—is meant applied by the stud to the discs.

With "load" also a force is described, due to the pre-load or by rotational movement, which acts upon the stud ends. "Load" is considered to be a vector in opposite direction than the axial component of a vector of the force that acts on the stud ends by the nuts.

"Pre-load" is considered a force that exist in a non-rotational state when all parts are assembled. The pre-load force is present as several rotor parts are connected or secured or clamped together.

It is a goal of an embodiment of the invention to reduce stress and fatigue of the stud and the threads.

SUMMARY OF THE INVENTION

Embodiments of the present invention seek to mitigate these drawbacks.

This objective is achieved by the independent claims. The dependent claims describe advantageous developments and modifications of the invention.

In accordance with an embodiment of the invention a threaded shank is provided for engaging with a threaded further component. The threaded shank may be particularly arranged in a turbomachine, even more particularly in a turbomachine rotor.

The further component comprises a cylindrical first thread with a uniform first thread pitch and a uniform first thread angle along an axial expanse of the first thread. "Cylindrical" means that a major diameter of the first thread may be located on a—ficticious—cylinder and/or that a minor diameter of the first thread may be located on a further—ficticious—cylinder.

The threaded shank comprises a second thread with a uniform second thread pitch and a uniform second thread angle along an axial expanse of the second thread and comprising a third thread with a uniform third thread pitch and a uniform third thread angle along an axial expanse of the third thread, the first thread angle and the second thread angle and the third thread angle being substantially identical, and the first thread pitch and the second thread pitch and the third thread pitch being substantially identical.

The second thread and the third thread are spaced apart axially by a thread-free region, i.e. non-threaded intermediate region. In other words, this thread-free region can be defined as a necked plain portion or a waist.

According to an embodiment of the invention, the second thread pitch and the third thread pitch have an axial offset to one another. In other words, the second thread pitch has an axial offset to the third thread pitch. "Axial offset" reflects a slight dislocation of the second thread compared to the third thread. The second thread and the third thread are mistuned. A second thread helix of the second thread and a third thread helix of the third thread have an axial offset. Using a different terminology, this means that a pitch line of second thread is axially offset from the pitch line of third thread.

The threaded shank may be a part of a tension stud or tension bolt, e.g. of a gas turbine engine. Such a tension stud may have a shank at both axial ends of the tension stud. The second and the third thread of the shank is then considered to be one end of a double end threaded tension stud. In this configuration the further component may be a locking nut that interacts with the shank of the tension stud.

An embodiment of the invention is special as a thread of the shank is broken such that a thread-free region lies between two threaded parts. Furthermore the two threaded parts—i.e. the second thread and the third thread—have the same pitch but are in offset to each other.

It has to be appreciated that the threaded shank is configured to interlock with the first thread of the further component assuming the first thread has a regular pitch. The first thread is a "standard" thread which corresponds—in all thread specific parameters—to the opposing second thread. It also corresponds to the opposing third thread. The first thread also has unmodified thread specific parameters over an axial expanse of the first thread.

As the first thread has a standard configuration the mere shank is claimed which can be connected to this standard first thread. Additionally also a connection assembly that comprises both the threaded shank and the component is claimed. Furthermore an embodiment of the invention is also directed to a gas turbine engine including a tension stud comprising the threaded shaft and the corresponding locking nut as the further component.

To summarise the embodiment of the invention that is directed to a threaded shank, a threaded shank of a turbomachine rotor for engaging with a threaded further component of the turbomachine rotor is provided. The threaded shank is adapted to engage with the further component, the further component comprising a cylindrical first thread with a uniform first thread pitch and a uniform first thread angle along an axial expanse of the first thread, the threaded shank comprising a second thread with a uniform second thread pitch and a uniform second thread angle along an axial expanse of the second thread and comprising a third thread with a uniform third thread pitch and a uniform third thread angle along an axial expanse of the third thread. The first thread angle and the second thread angle and the third thread angle are substantially identical, at least compatible with each other. The first thread pitch and the second thread pitch and the third thread pitch being substantially identical, at least compatible with each other. The second thread and the third thread are engageable with the first thread. The second thread and the third thread are spaced apart axially by a thread-free region, and a second thread helix of the second thread and a third thread helix of the third thread have an axial offset to one another, particularly when engaged with the threaded further component in a pre-loaded non-rotating state.

This invention is advantageous, particularly if a material is used that allows expansion in the thread-free region due to axial force applied or due to heat so that the thread-free region can expand axially if axial force or heat is applied. As a consequence, if no force or heat is applied only flanks of the second thread may be in load-bearing contact with flanks of the first thread and if force or heat is applied the flanks of the second thread and additionally also flanks of the third thread may be in load-bearing contact with flanks of the first thread.

Embodiments of the invention are not directed to an anti-vibration pre-load locking thread as it is known from self-locking bolts in which threads are displaced such that a pre-load is acted upon flanks of the thread merely by inserting an opposing thread into this pre-load locking thread. As a consequence, even if no external load is applied, the threads may be fixedly connected without clearance. So such a pre-load locking thread has an internal pre-load provided internally from the threads itself. In contrast to this anti-vibration pre-load locking thread the threaded shank according to an embodiment of the invention may be axially loose—i.e. axially movable within a limited range—as long as no external load or external tension is applied to the threaded shank or the opposing further component.

In an embodiment of the invention this may be realised by that the axial offset is less than an offset of an anti-vibrations pre-load locking thread.

It has to be noted that the term "pre-load" may be used in different ways. In one way two threads may have an offset such that generate itself—internally—a pre-load on flanks of the threads. As said, this is not in the scope of the invention. Furthermore "pre-load" may be applied externally by pushing or pulling one component in an assembly step. This may also be called pre-tension. This is the scenario which was discussed earlier in relation to FIG. 1, in which a part may be stretched onto which a threaded component is placed, the threaded component screwed on until it rests on a shoulder. In such a configuration, if the pushing or pulling of the component is then stopped, then a continuous force may be applied to the thread which is also called "pre-load", but this is an external pre-load (external from the thread) and applied due to tension in some of the parts. To distinguish these scenarios the wording "internal pre-load" (for thread-internal pre-load) and "external pre-load" (for pre-load applied from a part external to the thread) is at least partly used within this text. The external pre-load may also be called pre-tension in this document.

In a further embodiment the axial offset may be configured such that the second thread and the third thread provide an axial backlash—i.e. the second and third threads are itself internally pre-load free—with the first thread when the threaded shank and the further component are engaged without external axial force applied to the threaded shank and/or the further component. So, when no axial force is applied, which may be not a wanted configuration for a working machine but could be experienced in a lab, the threaded shank and the further component can experience wobbling when engaged.

Such an "external" axial force particularly is considered a force due to rotation of the turbomachine rotor. Also a pre-load force may be considered an "external" axial force in this sense.

Additionally, in case when the threaded shank is engaged with the further component, the axial offset may be configured such that a first force applied between a plurality of first thread flanks of the first thread of the component and a plurality of second thread flanks of the second thread results in a load-bearing contact of the first thread flanks and the second thread flanks and load-bearing-free and/or contactless connection of the first thread flanks and a plurality of third thread flanks of the third thread. This first force is an external force applied from the outside but not inherent internal force within the threads. This first force may be a result of an external pre-load (i.e. pre-tension) and can be called pre-loading force.

This configuration with load-bearing contact of the first thread flanks and the second thread flanks is a scenario of external pre-load, which also will be experienced in a gas turbine tension stud arrangement when in operation mode or even when the gas turbine is not running but properly assembled.

According to an embodiment of the threaded shank, in case when the threaded shank is engaged with the further component, the axial offset may be configured such that a second force greater than the first force applied between the first thread flanks of the first thread of the component and the second thread flanks of the second thread results in a load-bearing contact of the first thread flanks and the second thread flanks and load-bearing contact of the first thread flanks and the third thread flanks. That means that if no additional load is applied besides the pre-load or pre-tension flanks of the third thread will not be in load-bearing contact with flanks of the first thread. If the load increases during operation—i.e. above the external pre-load level—additional force will act upon the threaded shank and particularly on parts that axially can adapt its position, the thread-free region may expand in axial direction so that in a further mode of operation the third thread may rest in load-bearing contact upon the flanks of the first thread. The second force may be a result of rotation of the turbomachine rotor.

Peak stresses of threads may be reduced by this, particularly where cyclic fatigue is present, e.g. due to thermal and/or operational load changes. Stress may for example occur if a rotational symmetric stud to which the shank is connected may be unbalanced. This may happen due to bending of the rotor in operation.

To be expandable or elastic the thread-free region may be a metallic body. Material may be selected so that it will be sufficiently elastic in case of force and/or temperature is applied.

In general the threaded shank may be configured in dimension by selection of appropriate material to gain the wanted effect of expansion of the thread-free region.

The thread-free region may be of a smaller diameter than an inner diameter of the second thread and an inner diameter of the third thread of the threaded shank such that its axial length is extendable if axial force—external axial force, particularly due to rotation—is applied to the threaded shank and/or to the further component, particularly in case when the threaded shank is engaged with the further component. Particularly the diameter of the thread-free region may be substantially 80% or 70% or 60% of the inner diameter of the second thread and/or third thread.

As already previously indicated, the thread-free region may be elastic such that its axial length is extendable by the axial offset if the second force—an external axial force, particularly due to rotation—is applied to the threaded shank and/or to the further component, particularly in case when the threaded shank is engaged with the further component.

The thread-free region preferably is axially elongated.

In a preferred embodiment the threaded shank may comprise an external thread, i.e. male thread. The further component may comprise an internal thread, i.e. thread in a bore, also called female thread. Different configurations may also possible, e.g. in which the shank may have a cylindrical blind hole with an internal thread at its end. Then the further component may be configured in a form of a screw or bolt with an external thread corresponding to the internal thread of the blind hole.

The first, second and third threads may be configured as V-type thread, trapezoidal thread, Acme thread, or ISO metric screw thread (ISO: International Organization for Standardization). It may be configured according to the Unified Thread Standard or the British Standard Whitworth.

The threaded shank may be substantially rotational symmetric about an axis of the shank. The threads obviously are not perfectly symmetric as they have the task to provide a travel in axial direction. The shank may be axially elongated. Two pair of shanks may be located at opposite axial ends of an elongated stud or rod.

Embodiments of the invention can be applied to different types of connections. These can be located in a turbomachine—particularly gas turbines, compressors, turbochargers, steam turbines—, particularly in a rotor of a turbomachine. Also other machines or arrangements can be improved by this invention. Thus an embodiment of the invention is also directed to a connection assembly for engaging a threaded shank, particularly a tension stud or a tension stud bolt, with a threaded further component, particularly a locking nut engaged with the threaded shank of the tension stud bolt, the threaded shank and the further component are configured as previously defined.

By looking not only at the shank alone but at the connection assembly comprising the threaded shank and the opposing further component, it is a further embodiment that when the threaded shank and the further component are interlocked without external load applied the first thread and the second thread may have an axial clearance and the axial offset may be configured to be substantially ½ or ⅓ of the axial clearance. Depending on the configuration of the thread-free region and an axial extension that can be realised by the thread-free region, the axial offset may also be configured to different values, e.g. to be substantially ¼, ⅕, ⅙, ⅐, ⅛, ⅑ or ⅒ of the axial clearance. This may depend on the stiffness of the material used in the thread-free region, and/or the height of the thread and/or the pitch of the thread.

Axial clearance in the sense just given is meant as an axial play. To engage an outer thread into an inner thread, the inner thread must be axially wider than the size of the outer thread, as the outer thread otherwise could not be engaged into the inner thread. For engaged threads the axial distance is then the axial play, i.e. the axial distance between two opposing thread surfaces when the two thread surfaces on the other side are in direct contact.

Particularly embodiments of the invention can be applied to a gas turbine engine comprising a rotor rotatably mounted in a body about a rotor axis, an axial direction being defined along the rotor axis, the rotor comprising a stud, a first pre-load nut or a first rotor shaft, and a second pre-load nut or a second rotor shaft. The stud extends along the rotor axis and further comprises a first external end and a second external end, the first external end adapted to engage the first pre-load nut or the first rotor shaft and the second external end adapted to engage the second pre-load nut or the second rotor shaft, and comprises a shaft connected to the first external end and to the second external end. The latter shaft is an elongated connection element located in between the first and the second external end. The stud is configured as a threaded shank as defined define beforehand, wherein at least one of the first external end and the second external end comprises a second thread and a third thread and a thread-free region as discussed before, and wherein the pre-load nut is configured as a further component as defined previously. At least one of the first pre-load nut and the second pre-load nut and the first rotor shaft and the second rotor shaft will apply an external pre-load, according to the previously used wording.

It has to be acknowledged that the configuration may only comprise a single tension stud to clamp together rotating parts. In this arrangement an axis of the threaded shank will also be identical to the axis of the gas turbine engine. Nevertheless embodiments of the invention may also apply to arrangements in which parts are connected to each other by a plurality of threaded shanks on a plurality of separate bolts.

In a preferred embodiment at least one of the first pre-load nut and the second pre-load nut and the first shaft and the second shaft may be engaged to the stud such that a pre-load force or a pre-tension force may be applied in a first axial direction from the first thread to the second thread so that the first thread flanks and the second thread flanks are in load-bearing contact.

Furthermore, at least one of the first pre-load nut and the second pre-load nut and the first rotor shaft and the second rotor shaft may be engaged to the stud such that a pre-load force may be applied in a first axial direction from the first thread to the third thread so that the first thread flanks and the third thread flanks are in load-bearing-free and/or in contact-less connection.

Besides, during operation of the gas turbine engine, an operational load may be applied from the shaft to the first external end and/or the second external end in a second axial direction opposite to the first axial direction such that the thread-free region axially expands so that the first thread flanks and the third thread flanks are in load-bearing contact.

Previously the discussed configuration was limited to only two sections at the shank, the second thread and the third thread. As a further configuration further thread-free regions can be present to separate further threads of the shank. For example the third thread may be followed axially by a second thread-free region, the latter be followed axially by a fourth thread. The offset of the fourth thread to the second thread may be different than the offset between the second and the third thread.

An embodiment of the invention is also directed to a method for assembling a turbomachine rotor of a gas turbine engine, in which, if the rotor is not running—i.e. not rotating—there is contact between the flanges of the first thread and the second thread but no contact between the flanges of first thread and the third thread. In operation, if the rotor is running there is contact between the flanges of the first thread and the second thread—so the previously established contact remain intact—and additionally now between the flanges of first thread and the third thread.

The method is to be executed for a rotor comprising a first component with a threaded shank and a threaded further component, the further component comprising a cylindrical first thread, the threaded shank comprising a second thread and a third thread that are spaced apart axially by a thread-free region.

To elaborate more on the method, the method comprises the step of engaging the second thread and the third thread with the first thread, wherein a second thread helix of the second thread and a third thread helix of the third thread have an axial offset to one another when engaged with the threaded further component, particularly in a pre-loaded non-rotating state, such that (i) if the rotor is not rotating first thread flanks of the first thread of the further component are in load-bearing contact with second thread flanks of the threaded shank and the first thread flanks of the first thread of the further component are in load-bearing-free and/or in contact-less connection with third thread flanks of the third thread of the threaded shank, and such that (ii) if the rotor is rotating the first thread flanks of the first thread of the further component are in load-bearing contact with the second thread flanks of the threaded shank, and the first thread flanks of the first thread of the further component are in load-bearing contact with the third thread flanks of the third thread of the threaded shank.

It has to be noted that embodiments of the invention have been described with reference to different subject matters. In particular, some embodiments have been described with reference to apparatus type claims whereas other embodiments may describe features with reference to method type claims or to different type of apparatus claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Furthermore examples have been and will be disclosed in the following sections by reference to gas turbine engines. Embodiments of the invention are also applicable for any type of turbomachinery, e.g. compressors or steam turbines. Furthermore the general concept can be applied even more generally to any type of machine. It can be applied to rotating parts as well as stationary parts.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematical. It is noted that for similar or identical elements in different figures, the same reference signs will be used.

Some of the features and especially the advantages will be explained for an assembled gas turbine, but obviously the features can be applied also to the single components of the gas turbine but may show the advantages only once assembled and during operation. But when explained by means of a gas turbine during operation none of the details should be limited to a gas turbine while in operation.

DETAILED DESCRIPTION OF THE INVENTION

All figures show schematically parts of a rotor of gas turbine engine in a longitudinal section along an axis A of rotation. The rotor will be arranged rotatably about the axis A of rotation. Stator parts are not shown in the figures. Also elements to interlock rotor parts may also not be shown in the figures. All figures depict rotor parts in an orientation that on the left there would be an inlet and on the right there would be an outlet of a specific area with a fluid flow through a main fluid path of the gas turbine from left to right.

All rotor parts shown in the figures may be substantially rotational symmetric in respect to the axis A of rotation.

Figure 1A:
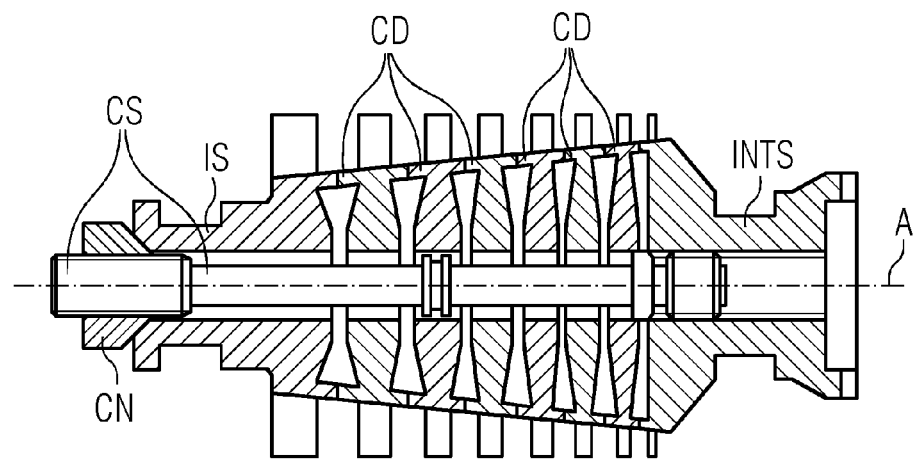
FIG. 1A is a prior art figure and shows schematically a gas turbine in an intermediate assembly stage after assembly of compressor discs via a first tension stud and a first nut.
Figure 1B:
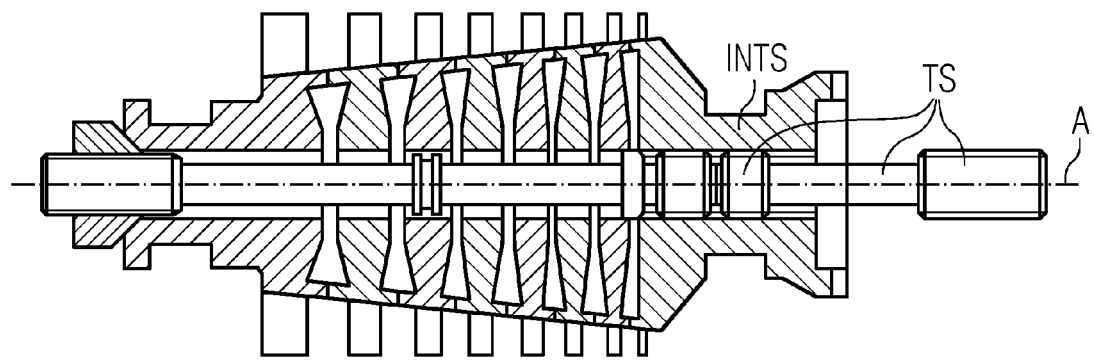
FIG. 1B is a prior art figure and shows schematically a gas turbine during assembly after providing a second tension stud for the turbine discs.
Figure 1C:
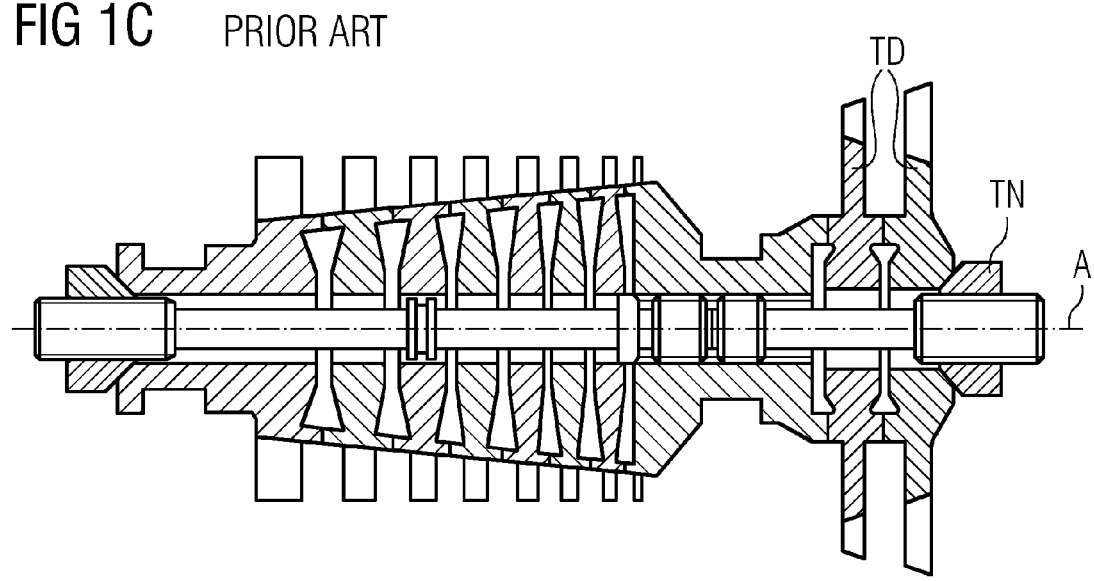
FIG. 1C is a prior art figure and shows schematically a gas turbine during assembly after assembly of turbine discs via the second tension stud and a second nut.

FIG. 1 was already discussed in the introductory section and show a prior art configuration of a gas turbine engine and how the rotor may be assembled.

In FIG. 1, a threaded compressor stud CS is engaged into a threaded bore in an intermediate shaft INTS. A compressor pre-load nut CN threaded onto the compressor stud end. For assembly an external may stretch the compressor stud CS and the compressor nut CN is tightened to apply an external pre-load applied to the compressor stud CS via the nut CN. A turbine stud TS is threaded into another axial end of the intermediate shaft INTS. A turbine nut TN is threaded onto the other end of the turbine stud TS. Again a tool may stretch the turbine stud TS and the nut TN is tightened to retain the pre-load when the tool is removed. All these threaded interfaces can be implemented according to an embodiment of the invention. As an example and referring to FIG. 2 the turbine stud TS and the turbine nut TN will be looked into in more detail. Nevertheless the concept may be applied to all introduced interfaces and even to completely other configurations.

Figure 2:
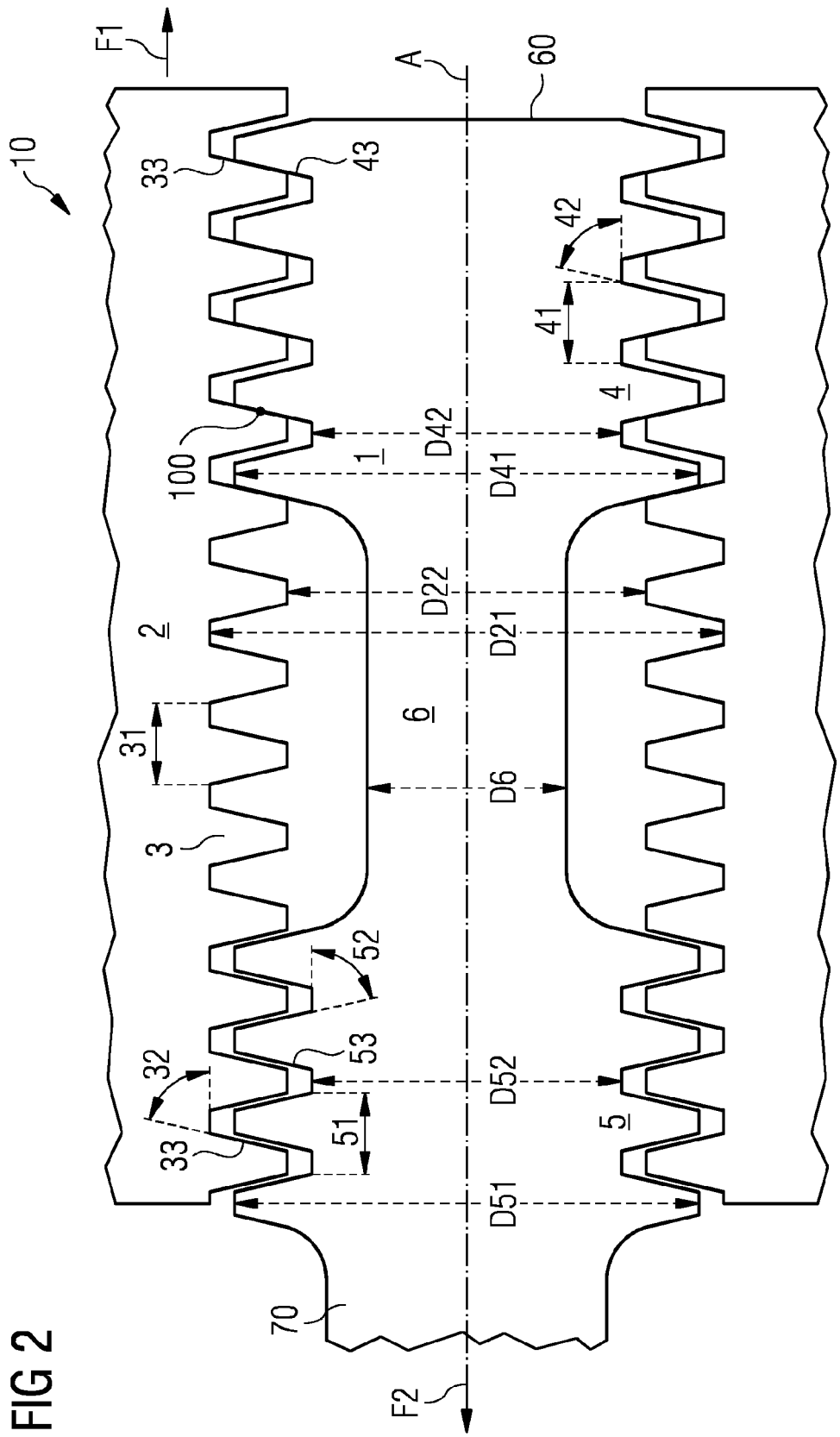
FIG. 2 shows schematically an end of the tension stud of a gas turbine arrangement illustrating an embodiment of the invention.

In FIG. 2 a part of a gas turbine engine is schematically shown in a cross sectional view with a cross section through an axis A of a tension stud. Only one axial end of the tension stud TS is shown, for example corresponding to an end of the turbine stud TS of FIG. 1. A threaded shank 1 is shown as an end of the turbine stud TS. A corresponding turbine nut TN is indicated in FIG. 2 by the reference 2 and represents the "threaded further component" as described in the claim.

The turbine nut 2 only is shown by its radial inner section comprising a first thread 3 that is configured as an internal thread.

The threaded shank 1 has two sections of external threads, a second thread 4 that is located at an axial end 60 of the shank 1 and a third thread 5 which defined the other end of the shank 1. Thus the third thread 5 is in direction of cylindrical part 70 of the tension stud, the latter having a lesser diameter than the shank 1. The cylindrical part 70 being the one that will end at a further threaded shank at an opposite end of the tension stud.

The second thread 4 and the third thread 5 are separated by a thread-free region 6. The thread-free region 6 has no threads and has a diameter D6 less than major diameter D21 of the first thread 3, less than major diameter D41 of the second thread 4, less than major diameter D51 of the third thread 5 but also less than minor diameter D22 of the first thread 3, less than minor diameter D42 of the second thread 4, less than minor diameter D52 of the third thread 5.

The opposing first thread 3 has a continuous thread along the length of the shank 1 and has no thread-free intermediate region.

All three threads 3, 4, 5 are very uniform in configuration overall there own length but also between each other, i.e. they have the same thread pitch with equal first thread pitch 31 and second thread pitch 41 and third thread pitch 51. They also have the same thread angle over their axial expanse with equal first thread angle 32 and second thread angle 42 and third thread angle 52, the thread angle defining the orientation of thread flanks in space defining the tilt in relation to an axial direction represented by axis A of the shank 1.

The axis A defines the axis of the shank 1 but also the axis of the threads 3, 4, 5 about which the threads 3, 4, 5 spiral.

According to an embodiment of the invention the thread-free region 6 has an axial expanse resulting in an axial offset 200 between the second thread pitch 41 and the third thread pitch 51, i.e. an axial offset 200 between a second thread helix of the second thread 4 and a third thread helix of the third thread 5. The axial offset 200 can be seen in FIG. 3, in which the upper half above the axis A shows the configuration of FIG. 2 in which no additional axial force is applied to the tension stud so that a flank 43 of the second thread 4 is in bearing contact with a flank 33 of the first thread 2 but whereas a flank 53 of the third thread 5 is not in physical contact and not in bearing contact with the flank 33 of the first thread 2, i.e. in contact-less connection 101. The axial distance between these flanks 33 and 53 define as the offset 200.

The second thread helix is in a separate region as the third helix but the helices could be fictitiously continued so that the two mentioned helices are not congruent and not superposable.

The tension stud may be pre-loaded or pre-tensioned by the turbine nut 2 so that all parts that are connected to each other and that form a rotor of the gas turbine engine are fixedly connected e.g. via a clamping force. This force will be permanently applied so that a first force F1 is acting in positive axial direction—the direction from the third thread 5 end to the second thread 4 end—and/or a force F2 is acting in negative axial direction—in direction of a opposite end of the tension stud which is not shown in FIG. 2. With this external pre-load via the first force F1 and/or the force F2 the offset 200 is present.

When a higher force is applied, e.g. a second force F1' acting in positive axial direction and/or force F2' acting in negative axial direction, which may be a result of operating the gas turbine engine and a consequence of centrifugal forces acting upon rotating parts the shank 1 is configured such that it experiences an axial stretch, but substantially limited by stretching the thread-free region 6 but substantially without stretching the threaded parts 4 and 5 of the shank 1, allowing the threaded parts 4 and 5 to move relative to each other. Depending on the material and the applied forces minor axial expansion may also take place in the threaded parts 4 and 5. Additionally the thread-free region 6 may also axially expand due to thermal expansion, particularly for a shank 1 that is located in a hot region of the gas turbine engine.

Figure 3:
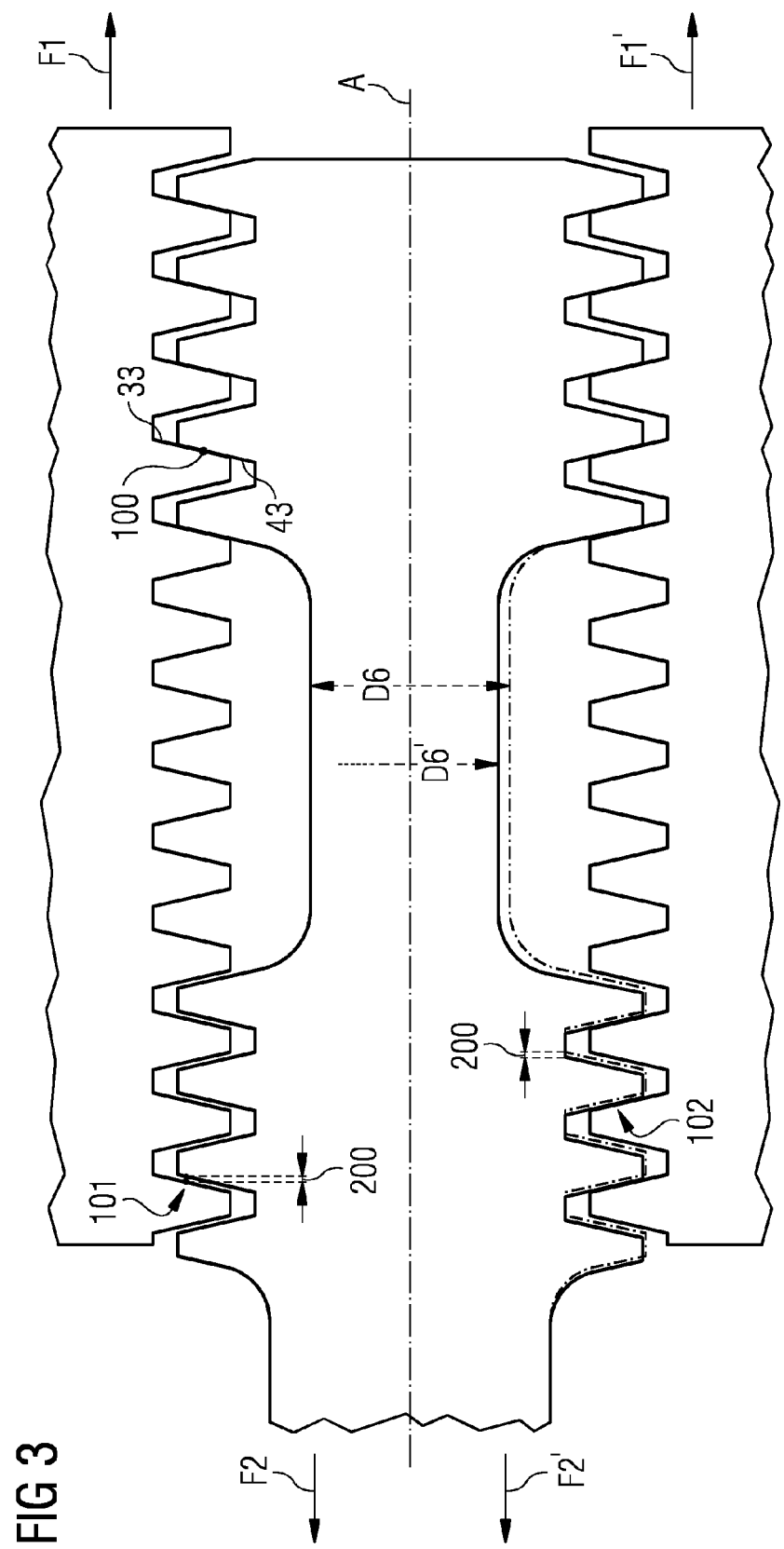
FIG. 3 shows schematically an end of the tension stud of a gas turbine arrangement illustrating an embodiment of the invention in two operating modes.

The effect of expansion is indicated in the lower half of FIG. 3. As dashed lines the mode of operation is again visualised when the gas turbine engine is not running, as shown in FIG. 2 or in the upper half of FIG. 3. With continuous lines the mode of operation is again visualised when the higher second force F2' and/or force F1' is applied to the shank 1. As a consequence the thread-free region 6 will be stretched and the diameter D6 will be reduced. This is indicated by the original diameter D6 and the diameter D6' which represents the surface during operation of the gas turbine engine. Diameter D6' is shorter than diameter D6, even though the scale in FIG. 3 is exaggerated.

Due to the stretched thread-free region 6, the axial position of the third thread 5 in relation to the axial position of the first thread 3 is changed so that the flank 53 of the third thread 5, which previously was not in contact with the opposing surface of the flank 33 of the first thread 3, may now be in load-bearing contact 102 with the flank 33. So the third thread 5 has been axially repositioned. The distance of repositioning may be between zero and the axial offset 200. Once the third thread 5 is axially aligned with the first thread 3 the second thread pitch 41 and the second thread pitch 51 will not be offset anymore.

In FIG. 3 this effect is visualised so that the original position of the third thread 5 is indicated by dashed lines and the new position during operation is indicated by solid lines. Again, the axial offset 200 can also be visualised in this region as an axial distance between the same point in both operation modes, once located on the dashed line and once located on the solid line.

What can be seen in FIGS. 2 and 3 is that the first thread 3 is fully "covering" the thread-free region 6. The second thread 4 and the first thread 3 are shown perfectly aligned at the axial end 60 but this is merely a simplification of the drawing. The second thread 4 may extend beyond the end of the turbine nut 2. Similarly the third thread 5 and the first thread 3 are shown perfectly aligned at the other axial end of the turbine nut 2 but this is also merely a simplification of the drawing. The third thread 5 may extend beyond that end of the turbine nut 2.

The configuration is explained in regards of FIGS. 2 and 3 is directed to improve fatigue life of highly loaded threaded studs in which threads are a life limiting feature. It is particularly be advantageous in engines if thread size and thread redundancy can not be freely selected as thread size is competing with other criteria which need to be optimised as well. An embodiment of the invention is particularly advantageous when potential high peak stresses in the thread forms at the nearest location to the applied load, e.g. at the threads at the "axially inner" end of the shank, facing away from the end 60.

This stress peak problem that could result in fatigue can be overcome by embodiments of the invention. To summarise in other words, a male thread consisting of two or more sections of thread on the same shank and adjoined to each other via a necked plain portion of shank, the threads engage with the mating female threads in two or even more stages. Stage one is where a primary section of male threads are engaged and in contact with the flanks of the female threads in the intended load carrying direction, in this state the primary section of threads are in contact but no load is applied. The second and/or additional sections of male threads are not in contact with the female threaded flanks i.e. there is a physical offset in the thread form from that of the primary threaded section. When load is applied, this may be preload as a result of torque tightening, load applied by mechanical pre-stretching at assembly, load induced in service or a combination, initially the first portion of threads (furthest from the load) which are in contact take the initial load, as the load increases the necked shank adjoining the two or more sections of threads is designed to stretch within elastic limits of stud material, as this occurs load is distributed to the addition sections of threads as they make contact. Using this principal of loaded sharing across threads it follows that "peak" load can be reduced for a given load scenario, as such a corresponding reduction of load will significantly improve the fatigue life at the threads.

The reduction of load will significantly improve the fatigue life.

The idea is of particular advantage where a bolted arrangement is subject to a variable load i.e. two members joined with a bolt and where one or more of the members is subject to thermal expansion. This applies to many bolted applications as in these a cold static load may be required whilst also coping with additional loads imposed in operation i.e. thermal, pressure and separation loads.

An embodiment of the invention may be applied for example also to a compressor rotor tension stud of a gas turbine engine. It may also be applied to a turbine rotor tension stud.

Embodiments of the invention may particularly be applied to different kind of turbomachines, e.g. axial turbomachines, or other kind of rotating machines that experience load along its axis of rotation. It may also be applied to other engines, machines, or arrangements, which experience at least two modes of operation with different load affecting the threads.

As previously disclosed, an embodiment of the invention particularly is advantageous for a bolt which is particularly rotational symmetric and having at both axial ends a threaded shank as defined earlier. The threaded shanks may have a greater diameter than a diameter of a shaft in between these shanks. Nevertheless the shaft may also have a wider section in a central portion of the shaft but having at least two section with a diameter less than then threaded shanks at the end.

Figure 4:
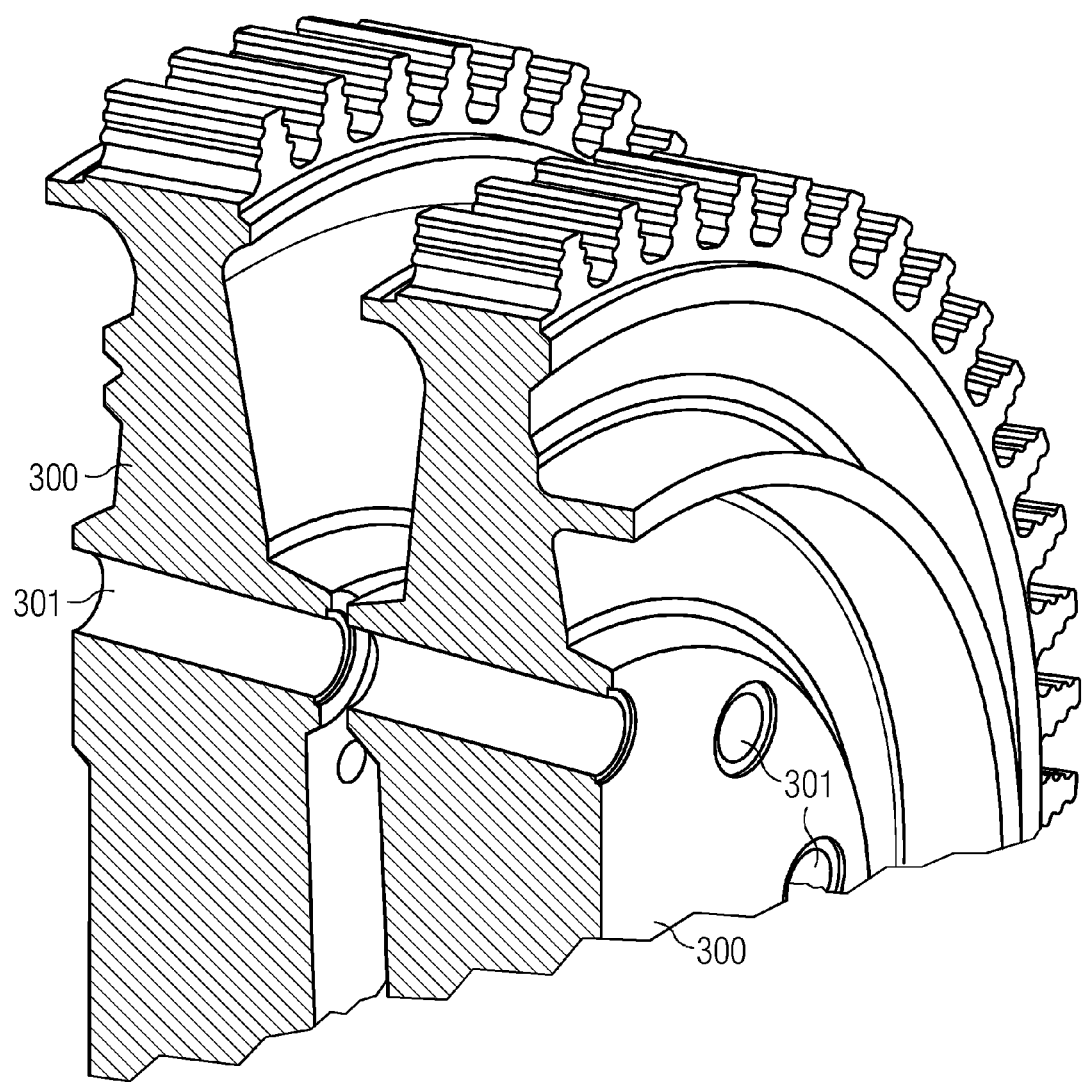
FIG. 4 shows schematically two turbine discs fractions into which several inventive bolts may be inserted.

Although the embodiments discussed so far focuses on rotor arrangements with a single centre bolt, an embodiment of the invention can also be applied to arrangements where the parts e.g. discs are held together with a number of tension studs placed in a circle i.e. in a bolt circle. Those tension studs are of a smaller diameter but of a similar length as the single tension stud described above. Such a multibolt configuration is shown in FIG. 4. Two turbine or compressor discs 300 are shown in a not assembled state. Holes 301 through these discs 300 may be present through which, if the holes 301 are properly aligned, bolts can be placed with threaded ends configured according to an embodiment of the invention, so that nuts with corresponding threads can be put at the ends of the bolts, so that the discs 300 can be attached to each other.

Embodiments of the invention may also be used for connecting two casing halfs together, e.g. casing halfs of a gas turbine. As the casing will also experience temperature differences also stress at the threads could arise which may be overcome by the invention. The application of embodiments of the invention clearly would be advantageous for large and heavy gas turbines. Particularly a bottom half of a casing will be connected to a top half of the casing. In such a configuration the bottom casing half may have a flange and the top casing half may also have a corresponding flange, both with a bore hole. The bore hole may comprise a thread that can correspond to a shank that may be inserted into the bore hole for connecting the two halfs. Alternatively the bore holes may be free of threads but bolt may be inserted through the two aligned bore holes, the bolt may have a head that can rest upon the flange and a nut may be screwed on the other end of the bolt, the nut resting on the opposite end on the other flange. The bolt may comprise at least one threaded shank at its end to engage with the nut. A casing of that style of two halves bolted together can be seen in US patent application publication US 2010/0080698 A1.

Embodiments of the invention may also be used in the field of wind turbines to provide connections of the tower or to provide connections of the wind turbine rotor. In such a wind turbine the tension may not always result from heat and high rotational speeds but maybe from wind affecting the tower or the rotor.

The invention claimed is:

1. A threaded shank of a turbomachine rotor for engaging with a threaded further component of the turbomachine rotor, the threaded shank adapted to engage with the further component, the further component comprising a cylindrical first thread with a uniform first thread pitch and a uniform first thread angle along an axial expanse of the first thread, the threaded shank comprising:
   a second thread with a uniform second thread pitch and a uniform second thread angle along an axial expanse of the second thread and comprising a third thread with a uniform third thread pitch and a uniform third thread angle along an axial expanse of the third thread,
   the first thread angle and the second thread angle and the third thread angle being substantially identical, the first thread pitch and the second thread pitch and the third thread pitch being substantially identical, the second thread and the third thread being engageable with the first thread, wherein
   the second thread and the third thread are spaced apart axially by a thread-free region, and a second thread helix of the second thread and a third thread helix of the third thread have an axial offset to one another.

2. The threaded shank according to claim 1, wherein the axial offset is less than an offset of an anti-vibrations pre-load locking thread configuration.

3. The threaded shank according to claim 1, wherein the axial offset is configured such that the second thread and the third thread provide an axial backlash with the first thread when the threaded shank and the further component are engaged without external axial force applied to the threaded shank and/or the further component.

4. The threaded shank of claim 3, wherein the external axial force is a force due to rotation of the turbomachine rotor.

5. The threaded shank according to claim 1, wherein in case when the threaded shank is engaged with the further component, the axial offset is configured such that a first force, particularly a pre-loading force, applied between a plurality of first thread flanks of the first thread of the component and a plurality of second thread flanks of the second thread results in a load-bearing contact of the first thread flanks and the second thread flanks and load-bearing-free and/or contact-less connection of the first thread flanks and a plurality of third thread flanks of the third thread.

6. The threaded shank according to claim 5, wherein when the threaded shank is engaged with the further component, the axial offset is configured such that a second force greater than the first force (F1, F2) applied between the first thread flanks of the first thread of the further component and the second thread flanks of the second thread results in a load-bearing contact of the first thread flanks and the second thread flanks and load-bearing contact of the first thread flanks and the third thread flanks.

7. The threaded shank according to claim 6, wherein the thread-free region is elastic such that its axial length is extendable by the axial offset if the second force is applied to the threaded shank and/or to the further component, particularly in case when the threaded shank is engaged with the further component.

8. The threaded shank of claim 6, wherein the second force applied is due to rotation of the turbomachine rotor.

9. The threaded shank according to claim 1, wherein the thread-free region is of a smaller diameter (D6) than an inner diameter of the second thread and an inner diameter (D52) of the third thread of the threaded shank such that its axial length is extendable if axial force is applied to the threaded shank and/or to the further component, particularly in case when the threaded shank is engaged with the further component.

10. The threaded shank according to claim 1, wherein the thread-free region is axially elongated.

11. A connection assembly of a turbomachine rotor for engaging a threaded shank, with a threaded further component, wherein the threaded shank and the further component are configured as defined in claim 1.

12. The connection assembly according to claim 11, wherein when the threaded shank and the further component are interlocked without external load applied the first thread and the second thread have an axial clearance and the axial offset is configured to be substantially ½ or ⅓ of the axial clearance.

13. The connection assembly of claim 11, wherein the connection assembly comprises a tension stud.

14. The connection assembly of claim 11, wherein the threaded further component comprises a locking nut.

15. A gas turbine engine comprising a rotor rotatably mounted in a body about a rotor axis, an axial direction being defined along the rotor axis, the rotor comprising a stud, a first pre-load nut or a first rotor shaft, and a second pre-load nut or a second rotor shaft, the stud extending along the rotor axis and the stud further comprising
   a first external end and a second external end, the first external end adapted to engage the first pre-load nut or the first rotor shaft and the second external end adapted to engage the second pre-load nut or the second rotor shaft,
   a shaft connected to the first external end and to the second external end; wherein the stud is configured as a threaded shank as defined in claim 1, at least one of the first external end and the second external end comprises a second thread and a third thread and a thread-free region, the second thread and the third thread and the thread-free region being configured as defined in claim 1, at least one of the first pre-load nut and the second pre-load nut and the first rotor shaft and the second rotor shaft is configured as a further component as defined in claim 1.

16. The gas turbine engine according to claim 15, wherein at least one of the first pre-load nut and the second pre-load nut and the first rotor shaft and the second rotor shaft is engaged to the stud such that a pre-load force is applied in a first axial direction from the first thread to the second thread so that the first thread flanks and the second thread flanks are in load-bearing contact.

17. The gas turbine engine according to claim 16, wherein at least one of the first pre-load nut and the second pre-load nut and the first rotor shaft and the second rotor shaft is engaged to the stud such that a pre-load force is applied in a first axial direction from the first thread to the third thread so that the first thread flanks and the third thread flanks are in load-bearing-free and/or in contact-less connection.

18. The gas turbine engine according to claim 16, wherein during operation of the gas turbine engine, an operational load is applied from the shaft to the first external end and/or the second external end in a second axial direction opposite to the first axial direction such that the thread-free region axially expands so that the first thread flanks and the third thread flanks are in load-bearing contact.

19. The threaded shank of claim 1, wherein the second thread helix of the second thread and the third thread helix of the third thread have an axial offset to one another when engaged with the threaded further component in a pre-loaded non-rotating state.

20. A method for assembling a turbomachine rotor of a gas turbine engine, the rotor comprising a first component with a threaded shank and a threaded further component, the further component comprising a cylindrical first thread, the threaded shank comprising a second thread and a third thread that are spaced apart axially by a thread-free region, the method comprising engaging the second thread and the third thread with the first thread, wherein a second thread helix of the second thread and a third thread helix of the third thread have an axial offset to one another when engaged with the threaded further component, particularly in a pre-loaded non-rotating state, such that:

(i) if the rotor is not rotating
first thread flanks of the first thread of the further component are in load-bearing contact with second thread flanks of the threaded shank and
the first thread flanks of the first thread of the further component are in load-bearing-free and/or in contact-less connection with third thread flanks of the third thread of the threaded shank, and (ii) if the rotor is rotating
the first thread flanks of the first thread of the further component are in load-bearing contact with the second thread flanks of the threaded shank, and
the first thread flanks of the first thread of the further component are in load-bearing contact with the third thread flanks of the third thread of the threaded shank.

* * * * *